(12) United States Patent
Navarro-Sorroche et al.

(10) Patent No.: US 10,408,968 B2
(45) Date of Patent: Sep. 10, 2019

(54) FIELD EMISSION ION SOURCE NEUTRON GENERATOR

(71) Applicant: Halliburton Energy Services, Inc., Houston, TX (US)

(72) Inventors: Juan Navarro-Sorroche, Plano, TX (US); Weijun Guo, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 14/914,560

(22) PCT Filed: Dec. 31, 2013

(86) PCT No.: PCT/US2013/078485
§ 371 (c)(1),
(2) Date: Feb. 25, 2016

(87) PCT Pub. No.: WO2015/102617
PCT Pub. Date: Jul. 9, 2015

(65) Prior Publication Data
US 2016/0216400 A1     Jul. 28, 2016

(51) Int. Cl.
*G01V 5/10*     (2006.01)
*G21G 4/02*     (2006.01)
*H05H 3/06*     (2006.01)

(52) U.S. Cl.
CPC ............... *G01V 5/10* (2013.01); *G21G 4/02* (2013.01); *H05H 3/06* (2013.01)

(58) Field of Classification Search
CPC .................................. G01V 5/10; G21G 4/02
(Continued)

(56) References Cited

U.S. PATENT DOCUMENTS 2,211,668 A     8/1940   Penning
2,983,820 A *   5/1961   Frentrop ................. G01V 5/10
                                                        250/526
(Continued)

FOREIGN PATENT DOCUMENTS

WO     WO-2008070103 A2    6/2008
WO     WO-2012105937 A1    8/2012
(Continued)

OTHER PUBLICATIONS

"International Application Serial No. PCT/US2013/078485, International Preliminary Report on Patentability dated Apr. 11, 2016", 9 pgs.

(Continued)

*Primary Examiner* — David P Porta
*Assistant Examiner* — Gisselle Gutierrez
(74) *Attorney, Agent, or Firm* — Gilliam IP PLLC

(57) ABSTRACT

A well logging tool includes a neutron generator having an ion source cathode comprising a nano-structure field emission (FE) array for producing a charged particle current routed through an ionizable gas, thus generating ions by electron impact ionization of the gas. The nanostructures can be provided by bundles of silicon nanotips grown on a substrate. The FE array can be provided on an axially facing substrate located co-axially in an elongate housing, with the charged particle current directed from the centrally located FE array to a co-axial annular anode and having axial and radial directional components.

21 Claims, 5 Drawing Sheets

(58) Field of Classification Search
USPC .......................................................... 250/253
See application file for complete search history.

(56) References Cited

U.S. PATENT DOCUMENTS

| | | | | |
|---|---|---|---|---|
| 3,246,191 A | * | 4/1966 | Frentrop | G01V 5/10 376/109 |
| 3,546,512 A | | 12/1970 | Frentrop | |
| 3,614,440 A | * | 10/1971 | Carr | F03H 1/00 250/423 R |
| 4,570,067 A | | 2/1986 | Gadeken | |
| 4,675,145 A | * | 6/1987 | Kuswa | H01J 27/02 250/423 R |
| 4,794,792 A | | 1/1989 | Flaum et al. | |
| 4,924,485 A | * | 5/1990 | Hoeberling | H01J 35/00 315/338 |
| 4,996,017 A | | 2/1991 | Ethridge | |
| 5,104,610 A | | 4/1992 | Bernardet et al. | |
| 5,293,410 A | | 3/1994 | Chen et al. | |
| 2001/0007783 A1 | * | 7/2001 | Lee | B82Y 10/00 438/154 |
| 2002/0096363 A1 | | 7/2002 | Evans et al. | |
| 2004/0022341 A1 | | 2/2004 | Leung et al. | |
| 2007/0228296 A1 | * | 10/2007 | Mouttet | B82Y 10/00 250/492.22 |
| 2009/0001889 A1 | * | 1/2009 | Miles | G01N 22/00 315/111.21 |
| 2009/0045329 A1 | | 2/2009 | Stoller | |
| 2009/0065712 A1 | | 3/2009 | Zillmer et al. | |
| 2009/0108192 A1 | | 4/2009 | Groves | |
| 2009/0114838 A1 | * | 5/2009 | Lozano | H01J 3/04 250/396 R |
| 2009/0135982 A1 | | 5/2009 | Groves | |
| 2010/0061500 A1 | | 3/2010 | Lou et al. | |
| 2010/0301196 A1 | | 12/2010 | Chu et al. | |
| 2011/0049345 A1 | | 3/2011 | Roberts | |
| 2011/0114830 A1 | | 5/2011 | Reijonen et al. | |
| 2011/0169492 A1 | | 7/2011 | Groves | |
| 2012/0213319 A1 | | 8/2012 | Kwan et al. | |
| 2013/0044846 A1 | | 2/2013 | Schenkel et al. | |
| 2013/0168542 A1 | | 7/2013 | Navarro-sorroche | |
| 2013/0293870 A1 | * | 11/2013 | Piech | G01N 21/53 356/72 |
| 2014/0184074 A1 | * | 7/2014 | Perkins | H01J 27/04 315/111.91 |
| 2015/0168579 A1 | * | 6/2015 | Perkins | H01J 35/045 378/53 |
| 2016/0231457 A1 | | 8/2016 | Navarro-Sorroche et al. | |
| 2016/0295678 A1 | | 10/2016 | Navarro-Sorroche et al. | |

FOREIGN PATENT DOCUMENTS

| | | |
|---|---|---|
| WO | 2013016145 A2 | 1/2013 |
| WO | WO-2013016145 A1 | 1/2013 |
| WO | WO-2015102607 A1 | 7/2015 |
| WO | WO-2015102615 A1 | 7/2015 |
| WO | WO-2015102617 A1 | 7/2015 |

OTHER PUBLICATIONS

"International Application Serial No. PCT/US2013/078485, Response filed Oct. 29, 2015 to Written Opinion dated Sep. 22, 2014", 4 pgs.

"European Application Serial No. 13900746.2, Extended European Search Report dated Nov. 20, 2015", 11 pgs.

"International Application Serial No. PCT/US2013/078456, International Search Report dated Sep. 25, 2014", 3 pgs.

"International Application Serial No. PCT/US2013/078456, Written Opinion dated Sep. 25, 2014", 5 pgs.

"International Application Serial No. PCT/US2013/078482, International Search Report dated Sep. 29, 2014", 3 pgs.

"International Application Serial No. PCT/US2013/078482, Written Opinion dated Sep. 29, 2014", 10 pgs.

"International Application Serial No. PCT/US2013/078485, International Search Report dated Sep. 22, 2014", 3 pgs.

"International Application Serial No. PCT/US2013/078485, Written Opinion dated Sep. 22, 2014", 8 pgs.

Chen, A X, et al., "Electronic neutron sources for compensated porosity well logging", Nuclear Instruments & Methods in Physics Research. Section A: Accelerators, Spectrometers, Detectors, and Associated Equipment, vol. 684, (Apr. 25, 2012), 52-56.

Persaud, Arun, et al., "Development of a Compact Neutron Source based on Field Ionization Processes", Arxiv.Org, Cornell University Library, 201 Olin Library Cornell University Ithaca, Ny 14853, (Oct. 12, 2010).

Sy, A, et al., "Novel methods for improvement of a Penning ion source for neutron generator applications", Review of Scientific Instruments, 83(2), 02B309, (2012), 3 pgs.

"European Application Serial No. 13900746.2, Office Action dated Jul. 22, 2016", 4 pgs.

"European Application Serial No. 13900746.2, Office Action dated Dec. 8, 2015", 1 pg.

"European Application Serial No. 13900838.7, Office Action dated Aug. 9, 2016", 2 pgs.

"International Application Serial No. PCT/US2013/078456, International Preliminary Report on Patentability dated Jul. 14, 2016", 7 pgs.

"International Application Serial No. PCT/US2013/078482, International Preliminary Report on Patentability dated Jul. 14, 2016", 12 pgs.

Johnson, et al., "Field ion source development for neutron generators", Nuclear Instruments and Methods in Physics Research A, vol. 663, Jan. 1, 2012 00:00:00.0, 64-74.

Persaud, et al., "A compact neutron generator using a field ionization source", Proceedings of the 14th International Conferenceon Ion Sources, Giardini Naxos, Italy, Sep. 1, 2011 00:00:00.0.

GCC Examination Report; Application serial No. GC 2014-28693; dated Sep. 30, 2017, 5 pages.

GCC Application Serial No. 2014-28694, Examination Report; dated Sep. 30, 2017, 5 pages.

Mexican Application Serial No. MX/a/2016/006368; Second Office Action; dated May 4, 2018, 3 pages.

Indonesian Application Serial No. P00201603236, Office Action; dated Jan. 25, 2019, 4 pages.

Indonesian Application Serial No. P00201603265; First Office Action; dated Oct. 23, 2018, 3 pages.

Mexican Application Serial No. MX/a/2016/005951; First Office Action; dated Aug. 29, 2018, 4 pages.

GCC Application Serial No. 28693: Examination report; dated Oct. 11, 2018, 4 pages.

* cited by examiner

FIELD EMISSION ION SOURCE NEUTRON GENERATOR

PRIORITY APPLICATIONS

This application is a U.S. National Stage Filing under 35 U.S.C. 371 from international Application No. PCT/US2013/078485, filed on 31 Dec. 2013, and published as WO 2015/102617 A1, on 9 Jul. 2015, which application and publication are incorporated herein by, reference in their entirety.

TECHNICAL FIELD

This disclosure generally relates to neutron generation for investigation of subsurface formation characteristics. Some aspects of the disclosure relate more specifically to neutron generators for well logging.

BACKGROUND

Pulsed-neutron formation evaluation tools interrogate the formation surrounding the borehole with high-energy neutrons produced by a neutron generator forming part of the tool. Because of interaction by the neutrons with elements of the tool, with the borehole, and with the formation, gamma radiation is created, which is then measured by gamma radiation sensors that also form part of the tool. Measurement data captured by the gamma radiation sensors can be processed to derive information about the properties of the borehole and the subsurface formations.

Typically, the energetic neutrons are produced by a fusion reaction caused by generating an ion beam and accelerating it into collision with a target dosed with target molecules or atoms. The fusion reaction is often a deuterium-tritium reaction. Most often, the mechanism used to generate the ion beam functions fundamentally on the principles disclosed by Penning in U.S. Pat. No. 2,211,668.

In such ion sources, a high voltage pulse is applied between an anode and a cathode to create an arc discharge that initiates ionization of an ionizable gas exposed to arc discharge.

BRIEF DESCRIPTION OF THE DRAWINGS

Some embodiments are illustrated by way of example and not limitation in the figures of the accompanying drawings.

DETAILED DESCRIPTION

In the following description, for purposes of explanation, numerous specific details are set forth to provide a thorough understanding of example embodiments. It will be evident to one skilled in the art, however, that the present subject matter may be practiced without these specific details.

Some embodiments of the disclosure provide a well logging tool which includes a neutron generator having an ion source cathode comprising an array of nano-emitters. The array of nano-emitters may provide a field emitter array to produce an electron current routed through an ionizable gas, thereby to produce ions by electron impact ionization of the gas. The term "nano-emitter" means a field electron emitter having at least two dimensions that are on the nanoscale, being between 0.1 and 100 nm. Each nano-emitter may be in the form of a nanotip which projects cantilever-fashion from a substrate. In one embodiment, the field emitter array comprises bundles of silicon nanotips grown on the substrate.

The field emitter array may form part of a field emitter array device that also includes an embedded extraction grid. A control arrangement may be configured to apply a voltage pulse across the extraction grid and an anode located in the ion chamber, thus causing emission of electrons from the field emitter array, and causing movement of the emitted electrons along an electron path through the ionizable gas.

In some embodiments, the nano-emitters are provided on a substrate which is oriented transversely to (e.g., being perpendicular to) a longitudinal axis of the neutron generator. In combination with such transverse substrate, the anode may comprise an annular anode element which is co-axially aligned with the substrate, but has a radius greater than the substrate. In such cases, the electron path may have a radial component, for example curving progressively radially outwards. Electrons emitted from the field emitter array may in such case be accelerated radially outwards. In a particular embodiment, the substrate is circular and is co-axial with the annular anode, resulting in an electron emission and radial acceleration which are symmetrical about the longitudinal axis.

Figure 1:
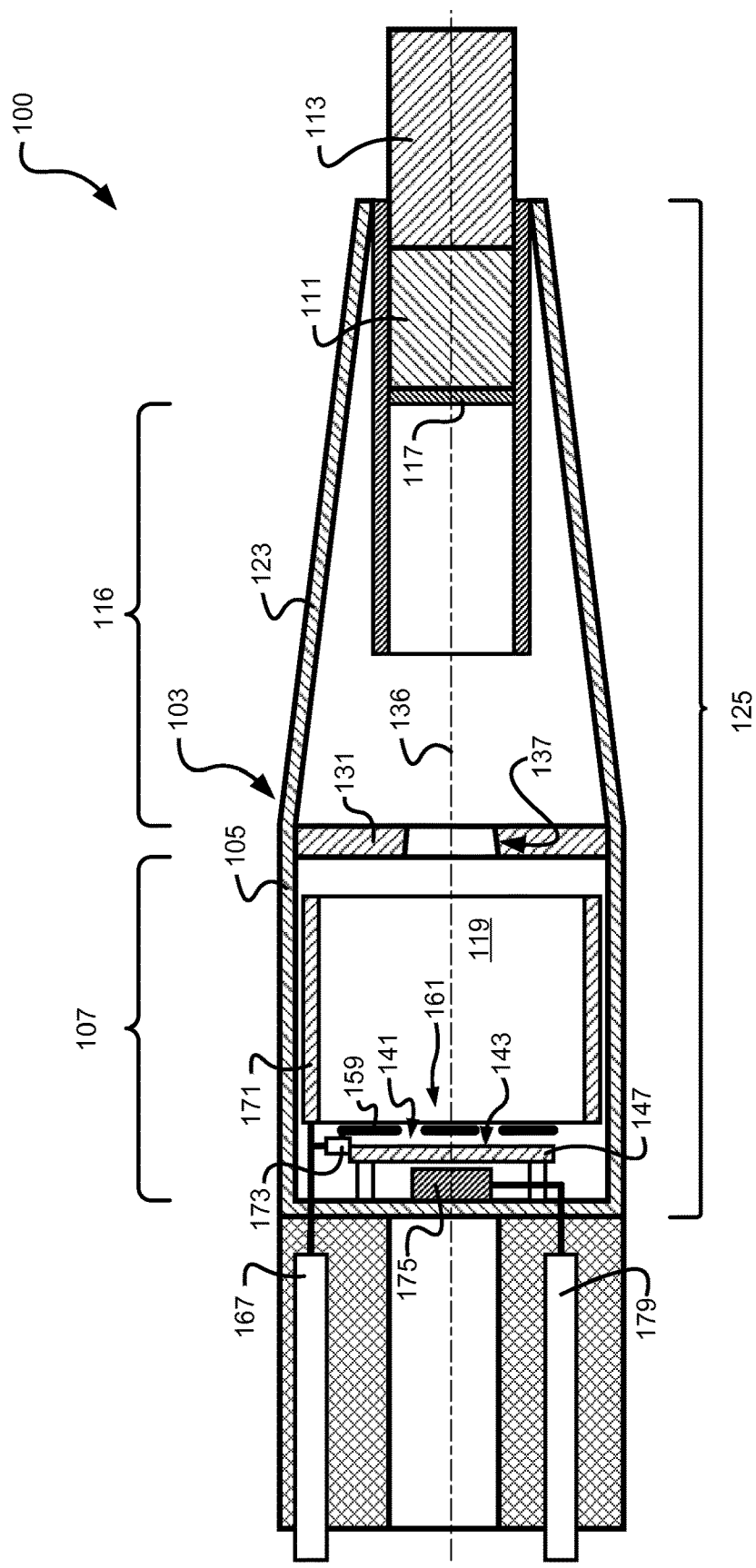
FIG. 1 is a schematic sectional side view of a neutron generator according to one example embodiment.

FIG. 1 shows a schematic diagram of a neutron generator 100 in accordance with an example embodiment. The neutron generator 100 is configured for incorporation in a logging tool 505 such as that described with reference to FIG. 5. The neutron generator 100 has an elongate housing 103 dimensioned for fitting longitudinally in a borehole 516 (see, e.g., FIG. 5) with radial clearance. In this example embodiment, the housing comprises a hollow cylindrical tube 105 dimensioned for longitudinal insertion in and movement along a borehole 516 of standard size, in this example embodiment having an outer diameter of about 1.69 inches. The tube 105 is of an electrically non-conductive, insulating material, for example being made of alumina ceramic.

Figure 4:
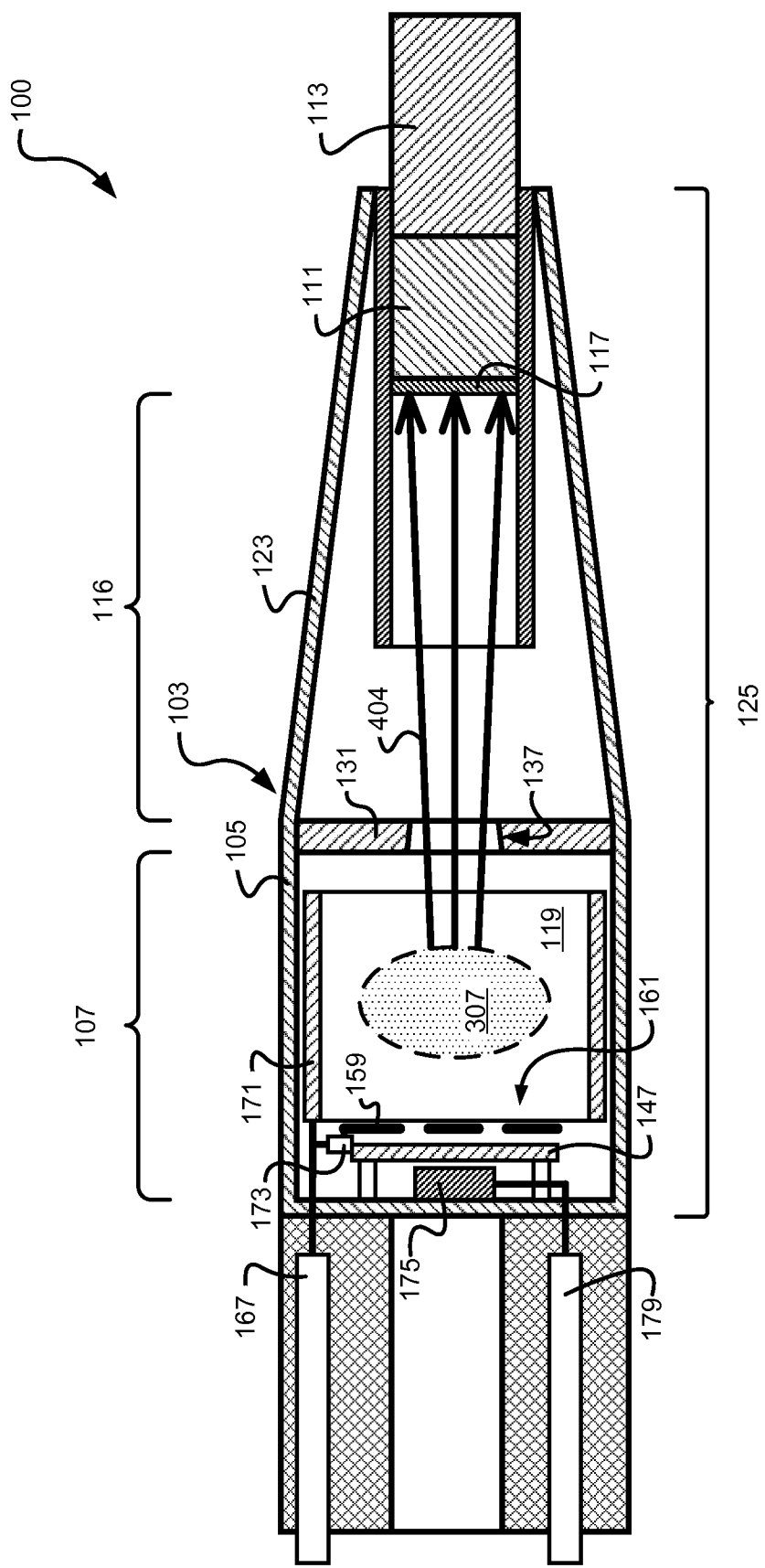
FIG. 4 is a view corresponding to FIG. 1, showing a deuterium-tritium plasma formed in an ion chamber of the example neutron generator, and further showing an ion beam comprising ions extracted from the ion chamber and accelerated into collision with a doped target, to cause neutron emission due to a fusion reaction.

The neutron generator 100 includes an ion source 107 for producing positively charged ions that can be extracted from the ion source 107 to form an ion beam (see, for example, FIG. 4, in which the ion beam is indicated by reference numeral 404) directed at a target rod 111 co-axial with the housing 103. A cylindrical target electrode 113 is positioned co-axially with the target rod 111 at an end of the target rod 111 furthest from the ion source 107. The target electrode 113 serves to provide an electric field for accelerating positively charged ions from the ion source 107 towards and into collision with the target rod 111. The target rod 111 includes a circular target layer 117 deposited on an axial end face of the target rod 111 directed towards the ion source 107. The target layer 117 is a metal layer doped or saturated with deuterium and/or tritium atoms, in this example being a titanium layer. When ions of the ion beam 404 collide with deuterium and/or tritium atoms in the target layer 117, energetic neutrons (N) are created by the well-established D+T+=He+n+14.6 MeV reaction. The neutrons escape in random, symmetrical directions from the target layer 117 towards the surrounding environment, which may be a subsurface formation (see for example FIG. 5). When the neutron generator 100 forms part of a subterranean logging tool 505, the neutrons are thus ejected into a surrounding formation to enable evaluation of physical characteristics of the subsurface formation.

An ion chamber 119 of the ion source 107 is provided by a circular cylindrical section of the housing 103, with a frustoconical high-voltage insulator 123 extending between the ion chamber 119 and the target rod 111. The housing 105 thus provides a vacuum envelope 125 which is hermetically sealed and maintained at very low pressure conditions, or vacuum conditions. The substantially cylindrical ion chamber 119 is co-axial with a longitudinal axis 136 of the neutron generator 100. In operation, the neutron generator 100 and the tool 505, of which it forms part is inserted in the borehole 516 such that the longitudinal axis 136 extends lengthwise along the borehole 516. The ion source 107 is, in this example embodiment, configured to produce a mixture of positively charged deuterium ions (D+) and tritium ions (T+). The ion chamber 119 has a bulkhead 131 at an end thereof proximate to the target rod 111. The bulkhead 131 defines a central, circular extraction aperture 137 to allow axial passage of accelerated ions from the ion chamber 119 on to the target layer 117 (see FIG. 4).

The ion source 107 is configured to produce positively charged ions by electron impact ionization resulting from energetic movement of electrons through an ionizable gas contained in the ion chamber 119, in this example comprising gas phase deuterium and tritium. For brevity of description, gas phase deuterium and tritium atoms in the ion chamber 119 are further referred to as the D/T gas. Electron discharge for use in the electron impact ionization process is provided in the ion source 107 by a field emitter (FE) device 161 that includes a field emitter array 141. The field emitter array 141 is thus configured to serve as an electron source for fast-moving electrons used in electron impact ionization in the ion chamber 119. As will be described in greater detail below, the field emitter array 141 comprises an array of nano-emitters, in this example consisting of bundles of silicon nanotips 202 (see FIG. 2) on a circular base disc 147 located co-axially in the ion chamber 119. The base disc 147 provides an axially facing circular substrate surface 143 for the nanotip array 141. The nanotip field emitter array 141 thus serves as an electron source cathode for the ion source 107. The ion source 107 further includes an annular anode 171 (also referred to as a ring anode) co-axial with the array 141 and located axially adjacent to the array 141, so that the nanotip field emitter array 141 is directed towards a central circular opening of the annular anode 171.

Field emission (FE) (also known as field electron emission and electron field emission) is emission of electrons induced by an electrostatic field. A field emitter array (FEA) is a particular form of an area field electron source. The structure of a field emitter array typically consists of a very large number of individual, similar, small field electron emitters, usually organized in a regular two-dimensional pattern. In the neutron generator 100, the individual small field electron emitters are provided by the nanotips 202 of the field emitter array 141. Field emission occurs when an electron tunnels through a potential barrier between a conductor or semiconductor matrix material and a low-pressure volume. The electron emission process is facilitated by the provision of the small field electron emitters such as the nanotips 202 of the present example embodiment.

Figure 2:
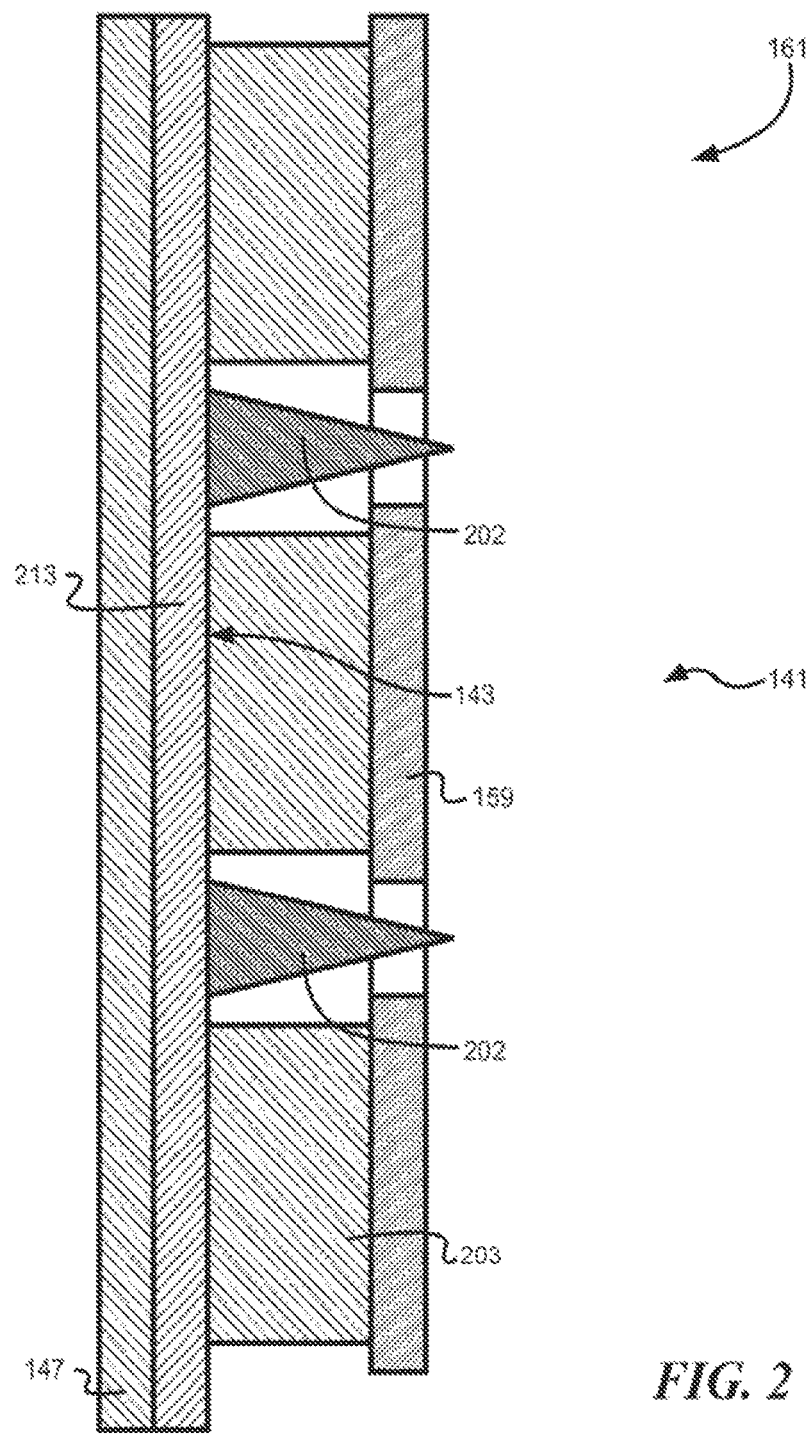
FIG. 2 is a simplified sectional side view, on an enlarged scale, of a nano-emitter that forms part of a field emitter array of the example neutron generator of FIG. 1, according to a particular example embodiment.

FIG. 2 shows a simplified side view of a part of the field emitter array device 161 of the example embodiment, including the field emitter array 141. The base disc 147 in this example embodiment provides a semiconductor substrate 213 for the field emitter array 141. In this example embodiment, the base disc 147 is constructed of metal, with a silicon layer on its axial end face providing the substrate 213. The field emitter nanotip array 141 comprises a multitude of nanotips 202, this example embodiment comprising silicon formations grown on the substrate 213.

Each nanotip 202 projects cantilever-fashion away from the base disc 147 and thus extends substantially parallel to the longitudinal axis of the ion chamber 119, normal to the axially outer surface of the circular substrate 213. Each nanotip 202 is roughly conical in shape, tapering to a tip end furthest from the base disc 147. The length of each nanotip is less than 10 nm, in this example embodiment being about 2 nm. In this example embodiment, the density of the nanotips 202 on the base disc 147 is between $10^4$ and $10^6$ nanotips per square centimeter.

The circular substrate 213 on the base disc 147 has a diameter sufficiently small to fit inside the ion chamber 119 of the neutron generator 100, bearing in mind that the neutron generator 100 is sized and shaped for incorporation in a borehole logging tool 505. In this example embodiment, the base disc 147 has a diameter of less than 1.2 inches. In this embodiment, the nanotips 202 of the field emitter array 141 are silicon nanotips grown on the base disc 147. Note that the nanotips 202 and the substrate 213 provided by the base disc 147 may, in other embodiments, be of different materials. In one embodiment, for example, the nanotips 202 may be made of molybdenum (Mo). Alternatively, the nanotips 202 may be of carbon. In yet a further example embodiment, each nanotip 202 may comprise, for example, a molybdenum base tip attached to the substrate 213 and a carbon or silicon nanotip molecularly formed on the end of the molybdenum base tip, using techniques known in the art.

Referring again to FIG. 1, is shown that the FE device 161 further includes an embedded extraction grid 159 to control current to the nanotips 202 of the field emitter array 141. In the FIG. 1, the extraction grid 159 is shown, for clarity of illustration, as being separate from the FE array 141, but the extraction grid 159 is, in this example embodiment, embedded in the FE device 161. Turning again to FIG. 2, it can be seen that the extraction grid 159 of the example embodiment is provided by a conducting gate layer parallel to the substrate 213 and spaced from the substrate 213 by an insulating layer 203. The conducting gate layer that provides the extraction grid 159 defines openings therein corresponding to the positions of the respective nanotips 202. The FE device 161 therefore provides a field emitter often referred to as a "Spindt-type" FEA. By applying appropriate voltage to the extraction grid 159, the current to the field emitter nanotips 202 is controlled, thus controlling electron emission by the FE array 141. Control circuitry for the neutron generator 100 includes an anode-cathode connector 167 to selectively control connection of the annular anode 171 and the FE array extraction grid 159, thereby to control voltage differences across the anode 171 and the extraction grid 159. The anode-cathode connector 167 is connected to the anode 171 and the FE extraction grid 159 through a bias resistor 173.

The ion source 107 further comprises a gas source in the sample form of a gas reservoir element 175 (FIG. 1) to allow selective control of D/T gas release into the ion chamber 119, and to control gas pressure in the ion chamber 119. The construction and operation of the gas reservoir element 175 may be in accordance with known methods for controlling ionizable gas release and pressure in neutron generator tubes. In this example embodiment, the gas reservoir element 175 comprises a tungsten filament coated with a film of zirconium or the like. Adsorption and desorption of ionization gas molecules (in this example embodiment consisting of deuterium and tritium atoms) can be controlled by controlling the temperature of the gas reservoir element 175, and thereby controlling ionization gas conditions in the ion chamber 119. A control arrangement of the neutron generator 100 accordingly includes a gas reservoir control connector 179 for controlling ionization gas conditions in the ion chamber 119 by controlling energization of the gas reservoir element 175.

As will be evident from the above description, the disclosure provides a pulsed neutron generator 100 based on the deuterium-tritium (D-T) fusion reaction having a nano-emitter array 141 as the ion source cathode. During operation, voltage is applied to the gas reservoir control connector 179, to supply sufficient current needed to the gas reservoir element 175 for providing the D/T gas working pressure in the ion chamber 119.

Thereafter, a voltage pulse of appropriate amplitude is applied to the anode-cathode connector 167. This voltage pulse causes extraction of a burst of electrons from the field emitter array 141 through the electron extraction mechanisms by the above. The extracted electrons are accelerated toward the annular ion source anode 171, being attracted to the positively charged anode 171. Turning now to FIG. 2, it can be seen that, because of the orientation of the substrate 213 and the nanotips 202 of the FE array 141, the extracted electrons have an initial velocity vector that is axially aligned, having substantially no radial component.

Figure 3:
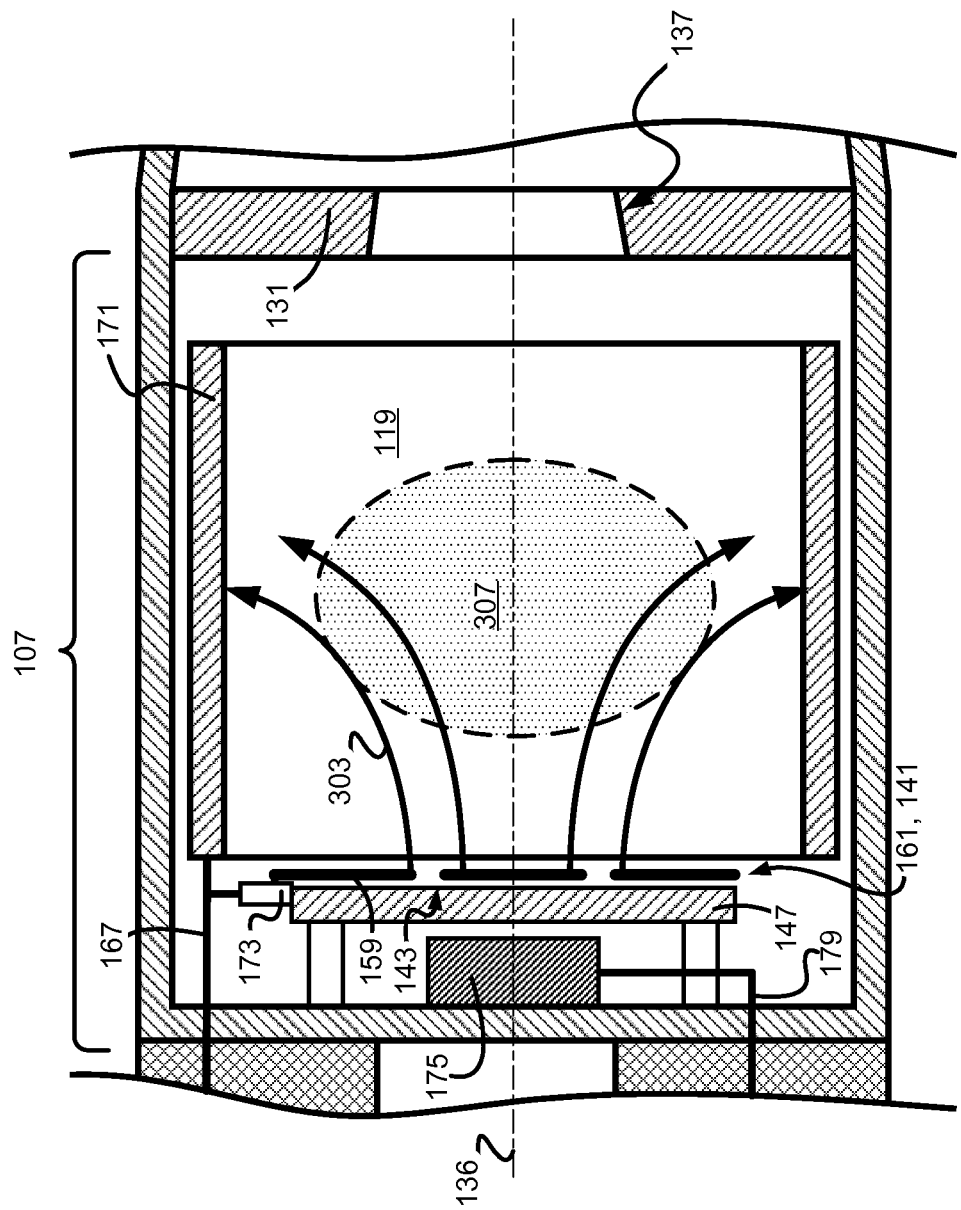
FIG. 3 is a schematic sectional side view, on an enlarged scale, of an ion source that forms part of the neutron generator of FIG. 1 according to an example embodiment, showing an electron current path in use followed by electrons extracted from an electron emitter array of the neutron generator.

Because the ring anode 171, however, is co-axial with the FE array 141 but located at a radius greater than that of the FE array 141, the extracted electrons are attracted radially outwards towards the ring anode 171. The electrons are thus rapidly accelerated radially outwards towards the ring anode 171. In FIG. 3, reference numeral 303 generally indicates a path followed by the extracted electrons under the influence of electric field generated by the pulsed voltage difference generated between the FE device 161 and the ring anode 171. As can be seen, the ionization path 303 of the extracted electrons follows a steep hyperbolic curve, as the electrons, in the absence of any axial decelerating force, retain their initial axial velocity, while their radial velocity progressively increases under radial accelerating forces caused by the prevailing electromagnetic field. In this example embodiment, the initial axial velocities of the extracted electrons are relatively small relative to their radial acceleration towards the ring anode 171. As a result, the ionization path 303 of the extracted electrons are substantially radial. In this example embodiment, the direct current (DC) voltage pulse applied to the anode-cathode connector 167 has a maximum amplitude of 500 V.

During movement from the FE array 141 of the extracted electrons along the ionization path 303, the rapidly moving electrons collide with the atoms of the D/T gas, thereby ionizing the D/T gas and creating D+ and T+ ions. In contrast to the extracted electrons, the positively charged D+ and T+ ions are repelled by the ring anode 171, thus being urged radially inwards towards a central region of the ion chamber 119, axially aligned with the extraction aperture 137. The positively charged ions collect in the center of the ion chamber 119 to form a plasma (generally indicated by reference numeral 307 in FIGS. 3 and 4) co-axially aligned with the extraction aperture 137 and the target rod 111.

The D/T ions of the plasma 307 are extracted through the extraction aperture 137 and are accelerated in the acceleration gap 116 due to the electric field provided by the target electrode 113, before impacting the target layer 117 on the target rod 111. The D+ and T+ ions thus extracted form a high energy ion beam, generally indicated by reference numeral 404 in FIG. 4. Impact of the ion beam 404 with the target layer 117 initiates nuclear fusion upon colliding with DT atoms absorbed in the target layer 117. As described earlier, this fusion reaction results in radiation of high-energy neutrons from the neutron generator 100.

It is a benefit of the neutron generator 100 as described in the example embodiment above, that the FE device 161 is capable of supplying an ionization current (e.g., a flow of electrons extracted by the extraction grid 159) that is large enough to enable sub-microsecond ignition of the ion source 107. Many conventional ion sources use substantially larger anode voltages for ion source ignition. Anode voltages of several thousand volts in such conventional ion sources often produce ion source current densities of a few mA/cm$^2$. By comparison, the example ion source 107 described above provides a sufficient electron current (e.g., 1 A/cm$^2$) with anode voltage that is orders of magnitude smaller (e.g., the 500V anode voltage described in the above example embodiment). The lower anode voltage of the disclosed neutron generator 100 beneficially reduces electrical stress and complications associated with very high voltages, thus improving robustness and reliability of the neutron generator 100 overall.

A further benefit of the example neutron generator 100 is that, unlike the above-mentioned conventional neutron generator tubes, it does not include a permanent magnet in the ion source 107. This simplifies the construction of the neutron generator 100, and also promotes compactness and reliability of a logging tool 505 in which the neutron generator tube 105 may be incorporated.

Figure 5:
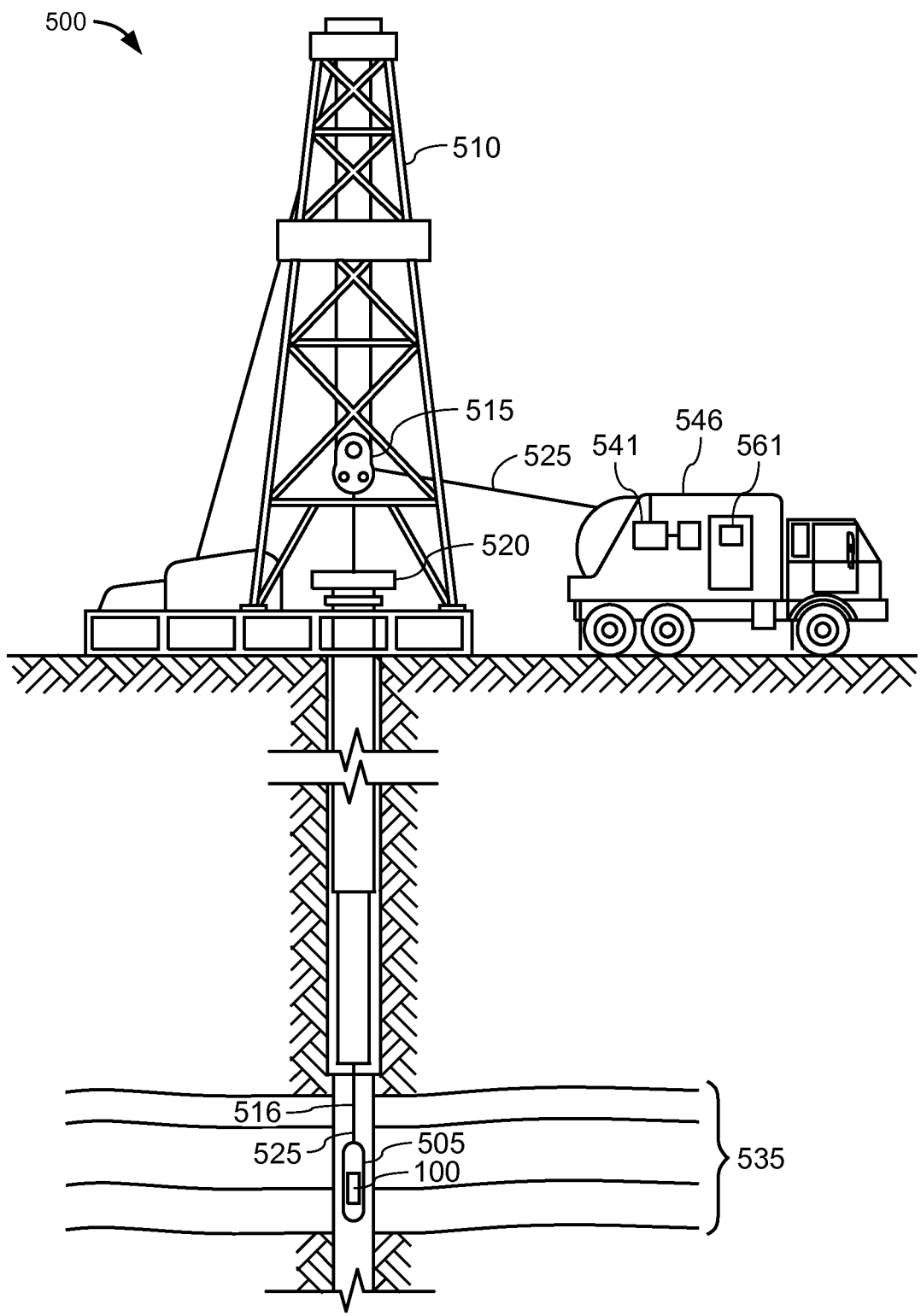
FIG. 5 shows a diagrammatic view of a wireline logging system that includes a neutron generator, according to an example embodiment.

FIG. 5 illustrates an example of a wireline logging system 500 that may incorporate a neutron generator 100 such as that described above with reference to the example embodiments of FIGS. 1-4. The neutron generator 100 may be incorporated in a tool 505 that is configured for subsurface deployment by insertion and movement along a borehole 516.

The system 500 includes a derrick 510 that supports a pulley 515. Drilling of oil and gas wells is commonly carried out by a string of drill pipes connected together so as to form a drilling string that is loaded through a rotary table 520 into a wellbore or borehole 516. FIG. 5 shows the borehole 516 with the drilling string temporarily removed to allow the wireline logging tool 505, for example being in the form of a probe or a sonde, to be lowered by wireline or logging cable 525 into the borehole 516.

The wireline logging cable 525 may have one or more electrical and/or optical conductors for communicating power and signals between the surface and the logging tool 505. Typically, the tool 505 is lowered to the bottom of the region of interest and subsequently pulled upward. During the upward trip, sensors located in the tool 505 may be used to perform measurements on subsurface formations 535 adjacent a borehole 516 as they pass by.

Measurements may comprise downhole pressure, downhole temperature, resistivity or conductivity of drilling mud and the Earth formations 535, the density and porosity of the Earth formations 535, as well as the orientation of the borehole 516. Sensor examples include, but are not limited to: a resistivity sensor, a porosity sensor, a nuclear density sensor, a magnetic resonance sensor, and a directional sensor package. In addition, formation fluid samples and/or core samples may be extracted from the formation 535 using a formation tester. Such sensors and tools are known to those skilled in the art. While described herein as a wireline logging operation, it will be understood by those skilled in the art that similar measurements may be made during drilling, completion, and production operations. Such sensors may be deployed using coiled tubing, drill pipe, and pre-wired drill pipe. In this example embodiment, the tool 505 has incorporated therein a neutron generator 100 such as that described above with reference to FIGS. 1-4. The tool 505 may, in some embodiments, be deployed downhole to determine formation parameters comprising density and porosity.

The measurement data can be communicated to a surface processor 541 in a logging facility 546 for storage, processing, and analysis. The logging facility 546 may be provided with electronic equipment for various types of signal processing. Similar log data may be gathered and analyzed during drilling operations (e.g., during logging while drilling, or LWD operations). The log data may also be displayed at the rig site for use in the drilling and/or completion operation on a display device 561.

One aspect of the disclosure realized by the above describe example embodiments is claimed a neutron generator comprising a housing configured for incorporation in a subsurface logging tool, the housing defining an ion source chamber; a gas source configured to deliver ionizable gas to the ion source chamber; and a field emitter array configured to deliver charged particles to the ion source chamber for interacting with the ionizable gas to produce ions usable for a fusion reaction that results in neutron emission from the neutron generator, the field emitter array comprising multiple nano-emitters. The charged particles emitted by the field emitter array may be energetic electrons, with ionization of the ionizable gas being through the electron impact ionization. The fusion reaction may comprise a deuterium-tritium fusion reaction, in which case the ionizable gas may be D/T gas.

The multiple nano-emitters may comprise multiple nano-tips, each nanotip comprising an elongate filament which is substantially aligned with a longitudinal axis of the housing. In some embodiments, the field emitter array may comprise multiple silicon nanotips on a substrate located in the ion source chamber.

The housing may be elongate and configured to be insertable lengthwise in a borehole, the field emitter array being substantially co-axial with a longitudinal axis of the housing, the neutron generator further comprising an ion source configured to accelerate the charged particles (e.g., electrons) delivered by the field emitter array at least partially radially outwards through the ion source chamber and towards a radial periphery of the ion source chamber.

The neutron generator may comprise an anode that is radially offset from the longitudinal axis and is configured to attract charged particles (for example, electrons) delivered to the ion source chamber by the field emitter array, in some embodiments comprising an annular element co-axial with the longitudinal axis of the housing. An inner radius of the annular anode element may be greater than a radially outer extremity of the field emitter array.

The field emitter array may comprise a substrate providing a substantially circular substrate surface on which the multiple nano-emitters are supported, the substrate being co-axial with the longitudinal axis of the housing and extending transversely thereto. The field emitter array and the anode may form part of a magnet-free ion source configured to produce the ions without a permanent magnet located adjacent the ion source chamber.

The neutron generator may comprise ion target carrying target particles for forming part of the fusion reaction in response to energetic impact of ions with the ion target, and may comprise an ion accelerator configured to extract the ions from the ion source chamber, and to accelerate the extracted ions onto the ion target. The target particles may comprise deuterium and/or tritium atoms/molecules.

The field emitter array may form part of a field emitter device, the neutron generator further comprising a control arrangement configured to apply an ion source voltage pulse between the field emitter device and the anode to cause ignition of impact ionization of the ionizable gas in the ion source chamber, the field emitter device serving as ion source cathode. The charged particles can be electrons, so that the ionization is by electron impact ionization. In some embodiments, the field emitter device may comprise an embedded extraction grid coupled to the control arrangement. The ion source voltage pulse may have an amplitude of 500 V or less. A turn-on/turn-of delay for an ion source comprising the field emitter device and the anode may be smaller than 1 µs.

Another aspect of the disclosure provides a method comprising incorporating a neutron generator in a subsurface logging tool, the neutron generator having a housing that defines an ion source chamber; delivering an ionizable gas to the ion source chamber; causing a field emitter array comprising multiple nano-emitters to deliver energetic particles (e.g., electrons) to the ion source chamber, thereby causing production of ions (for example, by electron impact ionization); and using the ions in a fusion reaction that results in neutron emission from the neutron generator.

Although systems, apparatuses, and methods according to the disclosure a have been described with reference to specific example embodiments, it will be evident that various modifications and changes may be made to these embodiments without departing from the broader scope of methods, apparatuses, and/or systems. Accordingly, the specification and drawings are to be regarded in an illustrative rather than a restrictive sense.

In the foregoing Detailed Description, it can be seen that various features are grouped together in a single embodiment for the purpose of streamlining the disclosure. This method of disclosure is not to be interpreted as reflecting an intention that the claimed embodiments in all instances have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:
1. A neutron generator comprising:
a housing defining an ion source chamber containing an ionizable gas;

an anode in the ion source chamber, wherein the anode is radially offset from a longitudinal axis of the ion source chamber; and a field emitter device comprising a field emitter array and an embedded extraction grid, the field emitter array comprising a plurality of field electron emitters, the field electron emitters comprising a plurality of nanotips, the embedded extraction grid comprising a plurality of openings corresponding to positions of the plurality of nanotips and each nanotip extending beyond a surface of the extraction grid thru a corresponding opening of the plurality of openings, the embedded extraction grid configured to control electron emissions by the field electron emitters based at least in part on a voltage applied to the embedded extraction grid; and wherein the neutron generator is configured so that a flow of electrons produced by the field electron emitters is routed through the ionizable gas to produce ions independent of a magnetic field from a magnet, and wherein the field emitter array is configured to supply the flow electrons large enough to enable sub-microsecond ignition of the ionizable gas.

2. The neutron generator of claim 1, wherein each nanotip comprising an elongate filament which is aligned with the longitudinal axis of the ion source chamber.

3. The neutron generator of claim 1, wherein the housing is elongate.

4. The neutron generator of claim 1, further comprising a substrate with a substrate surface that is perpendicular to the longitudinal axis-of the ion source chamber, wherein the field emitter array is attached to the substrate.

5. The neutron generator of claim 1, wherein the anode comprises an annular anode element that is co-axial with the longitudinal axis of the ion source chamber.

6. The neutron generator of claim 4, wherein the substrate surface is substantially circular.

7. The neutron generator of claim 1, further comprising a control arrangement to apply an ion source voltage pulse between a field emitter array substrate and the anode to accelerate emitted electrons in a radial path toward the anode and ionize the ionizable gas by electron impact.

8. The neutron generator of claim 7, wherein the ion source voltage pulse has an amplitude of 500 V or less.

9. The neutron generator of claim 8, wherein a turn-on/turn-off delay for an ion source comprising the field emitter array and the anode is less than 1 µs.

10. The neutron generator of claim 1, wherein the electron current is greater than or equal to 1 A/cm$^2$.

11. The neutron generator of claim 1, wherein the field electron emitters comprise multiple nanotips each having a length between 0.2 and 100 nanometers and wherein the field electron emitters have a nanotip density between 10,000 and 1,000,000 nanotips per square centimeter.

12. The neutron generator of claim 1, further comprising:
a target rod; and
a frustoconical insulator extending between the ion source chamber and the target rod.

13. A method comprising:
lowering a neutron generator into a borehole, wherein the neutron generator comprises a housing that defines an ion source chamber, and wherein the neutron generator further comprises a field emitter device comprising a field emitter array and an embedded extraction grid inside of the housing, the field emitter array comprising a plurality of field electron emitters, the field electron emitters comprising a plurality of nanotips, the embedded extraction grid comprising a plurality of openings corresponding to positions of the plurality of nanotips and each nanotip extending beyond a surface of the extraction grid thru a corresponding opening of the plurality of openings, the embedded extraction grid configured to control electron emissions by the field electron emitters based at least in part on a voltage applied to the embedded extraction grid;

delivering an ionizable gas to the ion source chamber;

applying an ion source voltage pulse between the field emitter array and an anode in the ion source chamber, wherein the anode is radially offset from a longitudinal axis of the ion source chamber; and producing an electric field that attracts electrons emitted from the field emitter array towards the anode through the ionizable gas independent of a magnetic field from a magnet, wherein the electrons emitted from the field emitter array provide sub-microsecond ignition of the ionizable gas.

14. The method of claim 13, wherein the ion source voltage pulse has an amplitude of 500 V or less.

15. The method of claim 13, wherein a turn-on/turn-off delay for ionization of the ionizable gas in the ion source chamber is less than 1 µs.

16. An apparatus comprising:
a body; and
a neutron generator housed by the body, wherein the neutron generator comprises,
a housing that defines an ion source chamber containing an ionizable gas;
an anode in the ion source chamber, wherein the anode is radially offset from a longitudinal axis of the ion source chamber; and
a field emitter device comprising a field emitter array and an embedded extraction grid, the field emitter array comprising a plurality of field electron emitters, the field electron emitters comprising a plurality of nanotips, the embedded extraction grid comprising a plurality of openings corresponding to positions of the plurality of nanotips and each nanotip extending beyond a surface of the extraction grid thru a corresponding opening of the plurality of openings, the embedded extraction grid configured to control electron emissions by the field electron emitters based at least in part on a voltage applied to the embedded extraction grid;
wherein an electron current produced by the field electron emitters is routed through the ionizable gas independent of a magnetic field from a magnet, and
wherein the field emitter array is configured to supply a flow of electrons extracted by the embedded extraction grid that is large enough to enable sub-microsecond ignition of the ionizable gas.

17. The apparatus of claim 16, further comprising a substrate with a substrate surface that is perpendicular to the longitudinal axis of the housing, wherein the field emitter array is attached to the substrate.

18. The apparatus of claim 16, wherein the anode comprises an annular anode element that is co-axial with the longitudinal axis of the housing.

19. The apparatus of claim 16, wherein each nanotip comprising an elongate filament which is aligned with the longitudinal axis of the housing.

20. The apparatus of claim 16, further comprising a control arrangement to apply an ion source voltage pulse between the field emitter array and the anode.

21. The apparatus of claim 16, wherein the field electron emitters comprise multiple nanotips each having a length between 0.2 and 100 nanometers and wherein the field electron emitters have a nanotip density between 10,000 and 1,000,000 nanotips per square centimeter.

\* \* \* \* \*